(12) United States Patent
Ogawa (10) Patent No.: US 8,959,603 B2
(45) Date of Patent: Feb. 17, 2015

(54) AUTHENTICATION SYSTEM

(76) Inventor: Hideharu Ogawa, Tokyo (JP)

( * ) Notice: Subject to any disclaimer, the term of this patent is extended or adjusted under 35 U.S.C. 154(b) by 50 days.

(21) Appl. No.: 13/143,916

(22) PCT Filed: Jan. 9, 2009

(86) PCT No.: PCT/JP2009/050239
§ 371 (c)(1),
(2), (4) Date: Jul. 8, 2011

(87) PCT Pub. No.: WO2010/079617
PCT Pub. Date: Jul. 15, 2010

(65) Prior Publication Data
US 2011/0277021 A1 Nov. 10, 2011

(51) Int. Cl.
*G06F 7/04* (2006.01)
*G06F 21/36* (2013.01)

(52) U.S. Cl.
CPC .................................... *G06F 21/36* (2013.01)
USPC .................................... 726/6; 726/7; 726/18

(58) Field of Classification Search
None
See application file for complete search history.

(56) References Cited

U.S. PATENT DOCUMENTS

| | | | |
|---|---|---|---|
| 6,141,751 A | 10/2000 | Ogawa | |
| 8,140,854 B2 * | 3/2012 | Ogawa | 713/183 |
| 2002/0147954 A1* | 10/2002 | Shea | 714/755 |
| 2003/0204725 A1 | 10/2003 | Itoi et al. | |
| 2005/0160297 A1* | 7/2005 | Ogawa | 713/202 |
| 2007/0234063 A1* | 10/2007 | Ueda et al. | 713/183 |
| 2008/0141362 A1* | 6/2008 | Torres et al. | 726/18 |
| 2009/0094689 A1* | 4/2009 | Gargaro et al. | 726/7 |
| 2010/0199100 A1* | 8/2010 | Goertzen | 713/185 |
| 2012/0005734 A1* | 1/2012 | Ogawa | 726/6 |

FOREIGN PATENT DOCUMENTS

| | | |
|---|---|---|
| JP | A 2000-010927 | 1/2000 |
| JP | A 2001-184310 | 7/2001 |
| JP | A 2003-323408 | 11/2003 |
| JP | A 2007-264839 | 10/2007 |
| JP | 2008-129640 | 6/2008 |
| JP | 2008129640 A * | 6/2008 |
| WO | WO 03/069490 | 8/2003 |

OTHER PUBLICATIONS

Written Opinion of International Application No. PCT/JP2009/050239 to Ogawa from ISA/JP dated Feb. 3, 2009; 3 pages.
Japanese Patent Office "Notification of Reasons for Rejection" received in Japanese patent application No. 2010-516312, dated Nov. 13, 2012, 3 pages.

* cited by examiner

*Primary Examiner* — Jeffrey Pwu
*Assistant Examiner* — Carlos Amorin
(74) *Attorney, Agent, or Firm* — Wong & Rees LLP; Kirk D. Wong (57) ABSTRACT

An authentication system by which character strings in squares are selected by a rule determined by a user out of a table in which character strings are assigned to obtain a one-time password. The user memorizes a rule of successively selecting three out of the positions of the squares in a table having five rows and five columns, for example. To each square (402) in the table (401) to be presented to the user, a randomly generated two-digit number is assigned. The table (401) is presented to the user, who arranges the numbers in the squares (402) on the basis of the user's own rule to generate a six-digit number used as a one-time password for authenticating the user. Therefore, the rule for obtaining a one-time password is easy for the user to memorize and a long one-time password can be obtained.

6 Claims, 5 Drawing Sheets

FIG.5

FIG.6 ions are disclosed in accordance with the principle of the present invention.

AUTHENTICATION SYSTEM

CROSS-REFERENCE TO RELATED APPLICATIONS; PRIORITY CLAIM

This U.S. National Stage Non-Provisional Application under 35 U.S.C. §371 claims benefit of International Application No. PCT/JP2009/050239, filed Jan. 9, 2009, the entire content of which is hereby incorporated by reference as if fully set forth herein.

TECHNICAL FIELD

The present invention relates to an authentication system favorable for improving security in an authentication system by which character strings in squares are selected by a rule determined by a user out of a table in which character strings are assigned to squares, and the selected character strings are arranged to obtain a one-time password, wherein the rule is easy for a user to memorize and a long one-time password can be obtained.

BACKGROUND ART

Heretofore, there has been proposed technology that obtains a one-time password from randomly generated character strings, etc. by extracting and arranging some of the character strings or characters according to a rule determined by a user in advance. Patent Literature 1 given below discloses technology in accordance with such a one-time password, and is in accordance with the invention proposed by the present Inventor.
Patent Literature 1: U.S. Pat. No. 6,141,751

Disclosure of Invention

With technology in accordance with such a one-time password, there is demand to made the rule easier for a user to memorize and demand to improve security by increasing the complexity, particularly the length, of the one-time password. There is strong demand for technology that satisfies both of these demands in a balanced manner.

The present invention solves such problems, and takes as an object to provide an authentication system favorable for improving security in an authentication system by which character strings in squares are selected by a rule determined by a user out of a table in which character strings are assigned to squares, and the selected character strings are arranged to obtain a one-time password, wherein the rule is easy for a user to memorize and a long one-time password can be obtained.

In order to achieve the above object, the following inventions are disclosed in accordance with the principle of the present invention.

An authentication system in accordance with a first aspect of the present invention is provided with a user information memory unit, a user name receiver, a table generator, a table presenter, a password receiver, a comparison generator, and an authenticator, and is configured as follows.

Herein, in the user information memory unit, user names are stored in association with sequences for selecting the positions of some plurality of squares from a table having a given number of rows and a given number of columns Meanwhile, the user name receiver receives input of a user name from a user.

Furthermore, the table generator, upon receiving input of the user name from the user, generates a table having the given numbers of rows and columns for the user name, in which character strings of given length are randomly assigned to each of the squares included in the table.

Then, the table presenter presents the table generated for the user name to the user.

Meanwhile, the password receiver receives input of a password from the user.

Furthermore, the comparison generator generates a comparison character string for the user name by selecting the positions of squares in the table generated for the user name in the sequence stored in association with the user name of the user in the user information memory unit, and arranging the character strings assigned to the squares at the selected positions.

Then, the authenticator determines whether or not to authenticate the user, on the basis of whether or not the password given by input received from the user matches the comparison character string generated for the user name of the user.

Also, an authentication system of the present invention can be configured as follows.

Namely, the table may be a 5×5 table in which two-digit numbers are randomly assigned to each of the squares included in the table as the character strings of given length.

Meanwhile, in the user information memory unit, a sequence for selecting the positions of three squares from among the positions of squares in the table are stored in association with a user name.

Also, an authentication system of the present invention can be configured to consist of server device, a mobile presentation device, and an authentication device.

Herein, the server device includes the above user information memory unit, table generator, comparison generator, and authenticator.

Meanwhile, the mobile presentation device includes the above table presenter.

In addition, the authentication device includes the above user name receiver and password receiver.

Furthermore, the server device and the mobile presentation device are communicably coupled by a mobile communication network.

Meanwhile, the server device and the authentication device are communicably coupled by a computer communication network.

In addition, the transmission of a table from the server device to the mobile presentation device is done via the mobile communication network.

Furthermore, the transmission of a user name from the authentication device to the server device, the transmission of a password from the authentication device to the server device, and the transmission of an authentication result from the server device to the authentication device are done via the computer communication network.

According to the present invention, it is possible to provide an authentication system favorable for improving security in an authentication system by which character strings in squares are selected by a rule determined by a user out of a table in which character strings are assigned to squares, and the selected character strings are arranged to obtain a one-time password, wherein the rule is easy for a user to memorize and a long one-time password can be obtained.

REFERENCE SIGNS 101 authentication system
102 user information memory unit
103 user name receiver
104 table generator
105 table presenter
106 password receiver
107 comparison generator
108 authenticator
151 server device
152 mobile presentation device
153 authentication device
161 mobile communication network
162 computer communication network
401 table
402 square

BEST MODE FOR CARRYING OUT THE INVENTION

Figure 1:
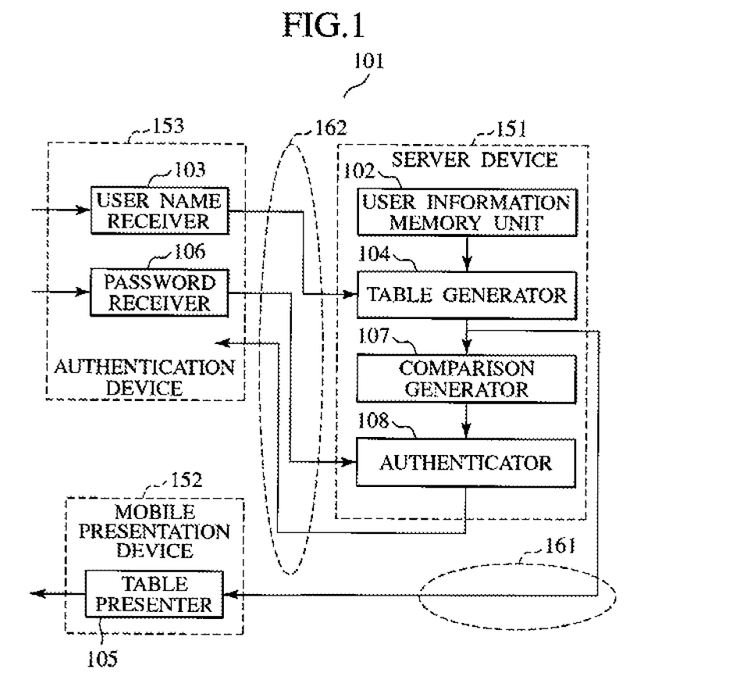
FIG. 1 is an explanatory diagram illustrating an authentication system in accordance with an embodiment of the present invention.

FIG. 1 is an explanatory diagram illustrating an authentication system in accordance with an embodiment of the present invention. Hereinafter, explanation will be given with reference to this drawing.

An authentication system 101 in accordance with the present embodiment is provided with a user information memory unit 102, a user name receiver 103, a table generator 104, a table presenter 105, a password receiver 106, a comparison generator 107, and an authenticator 108.

Typically, the authentication system 101 is configured so as to comprise a server device 151 such as a web (World Wide Web) server or mail server, a mobile presentation device 152 such as a mobile phone having web browsing functions and mail receiving functions, and an authentication device 153 such as a computer or security terminal that actually executes the processing required to authenticate a user.

In this mode, the server device 151 includes the above user information memory unit 102, table generator 104, comparison generator 107, and authenticator 108.

Meanwhile, the mobile presentation device 152 includes the above table presenter 105.

Additionally, the authentication device 153 includes the above user name receiver 103 and password receiver 106.

In this mode, the server device 151 and the mobile presentation device 152 are communicably coupled by a mobile communication network 161.

In contrast, the server device 151 and the authentication device 153 are communicably coupled by a computer communication network 162.

Meanwhile, in the user information memory unit 102, user names are stored in association with sequences for selecting the positions of some plurality of squares from a table having a given number of rows and a given number of columns.

Typically, the table is 5×5. Among the positions of squares in such a table, a sequence of positions of three squares is stored as the user's rule, but it is possible to appropriately modify the table size and the number of positions stored as a rule.

Meanwhile, the user name receiver 103 receives input of a user name from the user.

An input user name is transmitted from the authentication device 153 to the server device 151 via the computer communication network 162.

Furthermore, the table generator 104, upon receiving input of a user name from a user, generates a table having given numbers of rows and columns for the user name. Character strings of given length are randomly assigned to each of the squares included in the table.

Typically, two-digit numbers are used as the character strings of given length, but as long as they are character strings of two characters or more, various characters besides numbers, such as English characters, kana, kanji, etc. can be used.

A generated table is transmitted from the server device 151 to the mobile presentation device 152 via the mobile communication network 161.

Then, the table presenter 105 presents the table generated for the user name to the user.

The user creates a password by looking at the presented table, selecting the squares of his or her own rule in order from the table, and arranging the character strings assigned to those squares in order.

Meanwhile, the password receiver 106 receives input of a password from the user.

An input password is transmitted from the authentication device 153 to the server device 151 via the computer communication network 162.

Furthermore, the comparison generator 107 generates a comparison character string for the user name by selecting the positions of squares in the table generated for the user name in the sequence stored in association with the user name of the user in the user information memory unit 102, and arranging the character strings assigned to the squares at the selected positions.

Then, the authenticator 108 determines whether or not to authenticate the user, on the basis of whether or not the password given by input received from the user matches the comparison character string generated for the user name of the user.

After that, an authentication result is transmitted from the server device 151 to the authentication device 153 via the computer communication network 162 as necessary.

Figure 2:
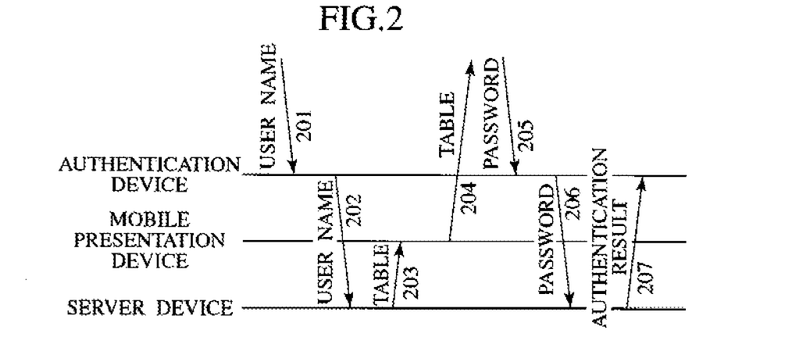
FIG. 2 is a session diagram illustrating a state of communication among a server device, a mobile presentation device, and an authentication device.

FIG. 2 is a session diagram illustrating a state of communication among a server device 151, a mobile presentation device 152, and an authentication device 153 in accordance with a mode. Hereinafter, explanation will be given with reference to this drawing.

The user, when trying to be authenticated by an authentication device 153, inputs a user name into that authentication device 153 (201).

That user name is then transmitted to the server device 151 (202).

The server device 151 then generates a table for the transmitted user name. In addition, the mail address of the mobile presentation device 152 stored for the user name is acquired, and information on the generated table is sent as mail to that mail address. In so doing, the table is transmitted from the server device 151 to the mobile presentation device 152 (203).

The user views the table received as mail by the mobile presentation device 152 (204), creates a password from that table on the basis of his or her own rule, and inputs the password into the authentication device 153 (205).

The input password is transmitted from the authentication device 153 to the server device 151 (206).

The server device 151 checks the transmitted password, the user name of the user using the authentication device 153, and the table generated for that user name, determines whether authentication succeeds or fails, and transmits an authentication result to the authentication device 153 (207).

The present mode uses technology able to push information to the mobile presentation device 152, such as electronic mail.

Figure 3:
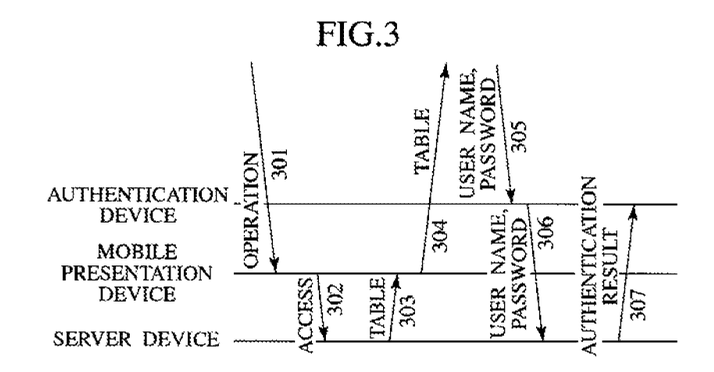
FIG. 3 is a session diagram illustrating a state of communication among a server device, a mobile presentation device, and an authentication device.

FIG. 3 is a session diagram illustrating a state of communication among a server device 151, a mobile presentation device 152, and an authentication device 153 in accordance with another mode. Hereinafter, explanation will be given with reference to this drawing.

The user, when trying to be authenticated by the authentication device 153, operates the mobile presentation device 152 (301) to web access the server device 151, and transmits a unique identification number of the mobile presentation device 152 (302).

Thereupon, the server device 151 generates a table for the transmitted unique identification number. Then, information on the generated table is transmitted as a reply to the web access (303). Thus, a table is transmitted from the server device 151 to the mobile presentation device 152.

The user views the table received as mail by the mobile presentation device 152 (304), creates a password from the table on the basis of his or her own rule, and inputs his or her own user name and the password into the authentication device 153 (305).

The user name and password input into the authentication device 153 is transmitted to the server device 151 (306).

The server device 151 checks the transmitted password, the user name of the user using the authentication device 153, and the table generated for that unique identification number, and determines whether authentication succeeds or fails for that user name. The unique identification number and user name are tied in the server device 151 in advance. Then, an authentication result is transmitted to the authentication device 153 (307).

The present mode uses technology such that the mobile presentation device 152 pulls information, such as a mobile web browser.

It is possible to appropriately select which of these modes to use depending on the application, user qualifications, etc.

Figure 4:
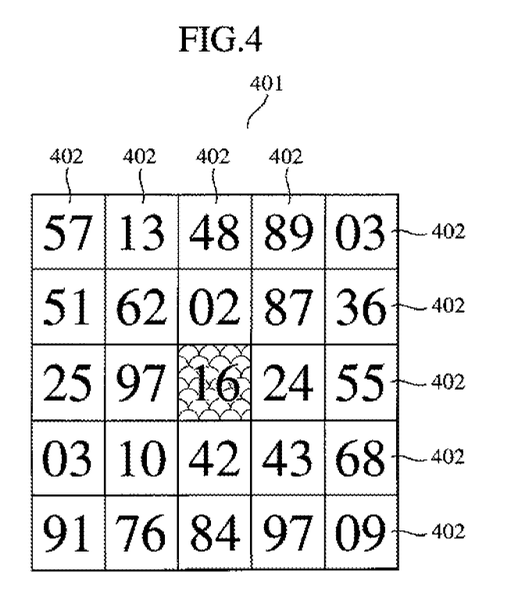
FIG. 4 is an explanatory diagram illustrating an exemplary table presented to a user.

FIG. 4 is an explanatory diagram illustrating an exemplary table generated in the present embodiment. Hereinafter, explanation will be given with reference to this drawing.

In the present embodiment, a table 401 consists of 5×5 squares 402, with a two-digit number (a character string of length 2) assigned inside each square 402.

Since two-digit numbers are included in the 5×5 squares, the total number of digits is 5×5×2=50. These numbers are randomly disposed inside the table 401.

The technique to randomly dispose numbers may be, for example, inserting five of each number from "0" to "9" into an array of length 50, and randomly shuffling the array.

A random shuffle can be realized by the following algorithm. Namely, take a[0] to a[N−1] to be the respective elements of an array having N elements, and take rand(n) to be a function that randomly returns one from among n integers from 0 to n−1.

Then, in each step of a loop that sequentially increments an integer i from 0 to N−2, execute the processing of "compute rand(N−i), take its value as k, and replace a[i] with a[i+k]".

The present embodiment is equivalent to the case where N=50.

In so doing, once 50 numbers are randomly shuffled, pick the first two of those numbers and successively assign them to each square 402 of the table 401.

Figure 5:
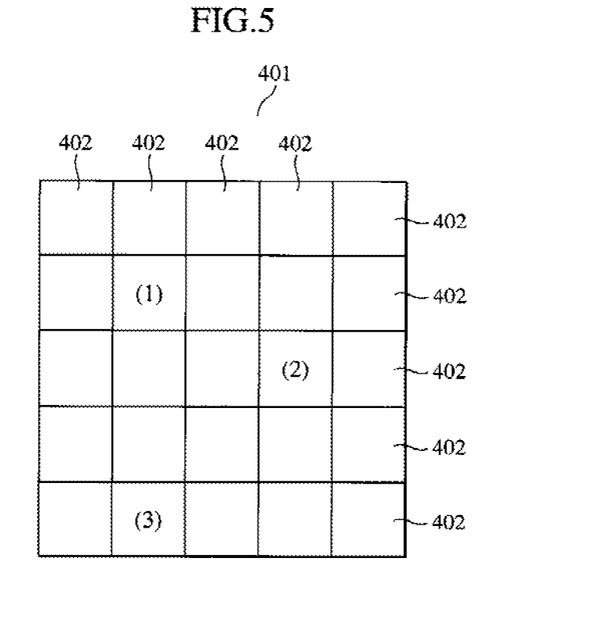
FIG. 5 is an explanatory diagram illustrating an exemplary rule assigned to a user.

FIG. 5 is an explanatory diagram illustrating an exemplary rule set for a user. Hereinafter, explanation will be given with reference to this drawing.

In this drawing, three squares are selected from among the squares 402 of a table 401, and numbers (1), (2), and (3) indicating the sequence of those squares are illustrated.

If the rule set in FIG. 5 is applied to the table presented in FIG. 4, "62" will be assigned to the (1) position, "24" will be assigned to the (2) position, and "76" will be assigned to the (3) position, and thus the obtained password becomes "622476".

In the present embodiment, since a table 401 is randomly generated each time authentication is required, the password input by the user functions as a one-time password.

Also, the number of digits in the number input by the user is six digits, and security is significantly improved compared to the four digits of an ordinary cash card PIN.

Furthermore, since the numbers assigned to the squares 402 of a table 401 are two digits rather than one digit, the number of positions that the user must memorize is smaller compared to the number of digits in the password.

Moreover, since the shape of a table 401 resembles a card used in Bingo, it also has the advantage of being readily familiar to the user. When displaying a table 401, the user's memory can be further ensured by setting the background color, character color, etc. of the center square 402 or the corner squares 402 differently from the other squares 402. Herein, in FIG. 4, the background pattern of the center square 402 has been modified.

Figure 6:
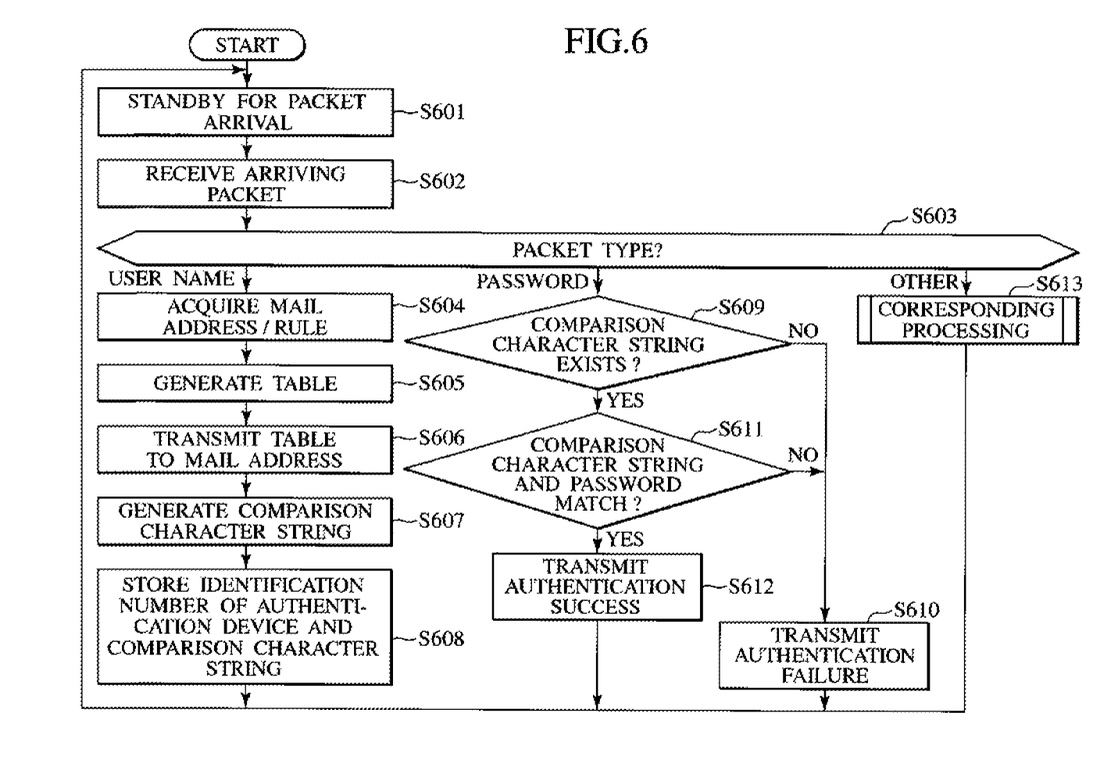
FIG. 6 is an explanatory diagram illustrating a control flow of a process executed by a server device in accordance with the present embodiment.

FIG. 6 is an explanatory diagram illustrating a control flow of a process executed by a server device 151 in accordance with the present embodiment. Herein, the process illustrated in this drawing corresponds to the session diagram illustrated in FIG. 2. Hereinafter, explanation will be given with reference to this drawing.

When the process is started, the server device 151 stands by for a packet from the authentication device 153 (step S601). During this standby, it is possible to execute other processes as co-routines.

At this point, if a user wanting to be authenticated inputs a user name into the authentication device 153, a packet specifying the user name is transmitted to the server device 151.

Then, if a packet is received at the server device 151 (step S602), the server device 151 inspects the packet type (step S603), and if the packet specifies a user name (step S603; user name), the server device 151 references the user information memory unit 102 and acquires the following information stored in association with that user name (step S604).

(a) The mail address of the mobile presentation device 152 used by the user.

(b) The rule for the user, or in other words, the sequence of positions of squares 402 selected from a table 401.

Additionally, the server device 151 generates a table 401 in which two-digit numbers are randomly assigned to respective squares 402 as described earlier (step S605), which is then specified in an electronic mail message and transmitted to the acquired mail address (step S606).

Herein, it may be configured such that the table 401 itself is specified in the electronic mail message. Alternatively, it may be configured such that an electronic mail message specifying a URL of a temporarily prepared image representing the table 401 on the server device 151 is transmitted, with the user being able to view the table 401 by using browser functions of the mobile presentation device 152.

In addition, the server device 151 generates a comparison character string by selecting squares 402 from the generated table 401 in order on the basis of the acquired rule and arranging the numbers assigned to the selected squares (step S607).

Then, the server device 151 associates and temporarily stores the comparison character string with an address, identification number, etc. of the packet transmission source, or in other words, the authentication device 153 from which the user sought authentication (step S608), and returns to step S601. The information stored at this point is automatically deleted once a fixed period (from several minutes to several tens of minutes is typical) elapses.

Then, if the mobile presentation device 152 receives an electronic mail message, the table 401 specified in the electronic mail message is presented to the user.

Thereupon, the user generates a password from the table 401 on the basis of his or her own rule, and inputs the password into the authentication device 153. In so doing, a packet specifying the password is transmitted from the authentication device 153 to the server device 151.

In the case where a packet received at the server device 151 specifies a password (step S603; password), the server device 151 checks if a comparison character string associated with the address or identification number of the packet transmission source is being temporarily stored in step S607 (step S609).

In the case where such a comparison character string is not found (step S609; No), the server device 151 informs the authentication device 153 that authentication has failed (step S610), and returns to step S601.

In the case where a comparison character string is found (step S609; Yes), the server device 151 checks whether or not the comparison character string matches the password (step S611). In the case of a non-match (step S611; No), authentication fails, so the server device 151 proceeds to step S610.

In the case where both match (step S611; Yes), the server device 151 informs the authentication device 153 that authentication has succeeded (step S612), and returns to step S601.

Thereupon, the authentication device 153 determines whether or not to provide a service in the authentication device 153 on the basis of the communicated authentication result.

Herein, in the case where a received packet type is other than the above (step S603; other), corresponding processing is executed (step S613), and the server device 151 returns to step S601.

Figure 7:
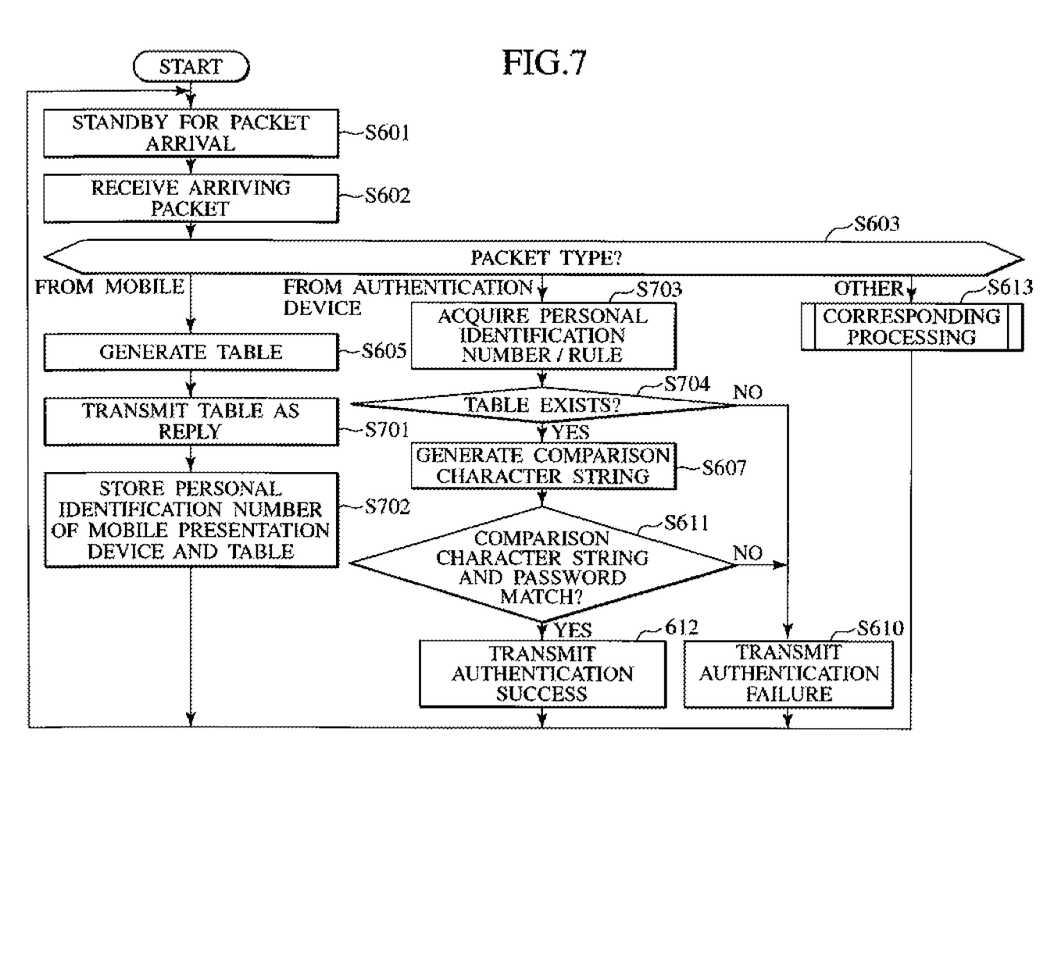
FIG. 7 is an explanatory diagram illustrating a control flow of a process executed by a server device in accordance with the present embodiment.

FIG. 7 is an explanatory diagram illustrating a control flow of a process executed by a server device 151 in accordance with the present embodiment. Herein, the process illustrated in this drawing corresponds to the session diagram illustrated in FIG. 3. Hereinafter, explanation will be given with reference to this drawing.

When the process is started, the server device 151 stands by for a packet from the mobile presentation device 152 or the authentication device 153 (step S601).

If a user wanting to be authenticated tries to access the server device 151 via the mobile presentation device 152, a packet is transmitted to the server device 151.

If a packet is received (step S602), the server device 151 inspects the packet type (step S603).

In the case where this is an access from the mobile presentation device 152 (step S603; from mobile), the server device 151 generates a table 401 in which two-digit numbers are randomly assigned to respective squares 402 as described earlier (step S605), and the generated table is transmitted to the mobile presentation device 152 as a response (step S701). The information stored at this point is automatically deleted once a fixed period (from several minutes to several tens of minutes is typical) elapses.

Additionally, the server device 151 associates and temporarily stores a unique identification number of the mobile presentation device 152 that transmitted the packet and the generated table 401 (step S702), and returns to step S601.

The mobile presentation device 152, having received a response packet, presents the table 401 specified in the packet to the user.

Thereupon, the user generates a password from the table 401 on the basis of his or her own rule, and inputs the password together with a user name into the authentication device 153. In so doing, a packet specifying the user name and password is transmitted from the authentication device 153 to the server device 151.

In the case where a packet received at the server device 151 specifies a user name and password, or in other words, in the case of a packet transmitted from the authentication device 153 (step S603; from authentication device), the server device 151 references the user information memory unit 102 and acquires the following information stored in association with that user name (step S703).

(a) The unique identification number of the mobile presentation device 152 used by the user.

(b) The rule for the user, or in other words, the sequence of positions of squares 402 selected from a table 401.

Additionally, the server device 151 checks whether or not there is a table 401 temporarily stored in step S702 in association with the acquired unique identification number (step S704).

In the case where a table 401 is not being stored (step S704; No), the server device 151 informs the authentication device 153 that authentication has failed (step S610), and returns to step S601.

In the case where there is a table 401 temporarily stored in step S702 in association with the unique identification number acquired in step S703 (step S704; Yes), the server device 151 generates a comparison character string by selecting squares 402 from the generated table 401 in order on the basis of the rule acquired in step S703 and arranging the numbers assigned to the selected squares (step S607).

Additionally, the server device 151 checks whether or not the comparison character string matches the password (step S611). In the case of a non-match (step S611; No), authentication fails, so the server device 151 proceeds to step S610.

In the case where both match (step S611; Yes), the server device 151 informs the authentication device 153 that authentication has succeeded (step S612), and returns to step S601.

The authentication device 153 determines whether or not to provide a service in the authentication device 153 on the basis of the communicated authentication result.

Herein, in the case where a received packet type is other than the above (step S603; other), corresponding processing is executed (step S613), and the server device 151 returns to step S601.

Herein, in the above embodiment, a table 401 is completely generated in the server device 151 before being transmitted to the mobile presentation device 152. However, it may also be configured such that a random number generation algorithm is shared between the server device 151 and the mobile presentation device 152, wherein a random number seed is selected by the server device 151, this seed is transmitted to the mobile presentation device 152, and the table 401 is generated by both. In this case, it is desirable to improve security by regularly updating the algorithm as appropriate for each user.

INDUSTRIAL APPLICABILITY

According to the present invention, it is possible to provide an authentication system favorable for improving security in an authentication system by which character strings in squares are selected by a rule determined by a user out of a table in which character strings are assigned to squares, and the selected character strings are arranged to obtain a one-time password, wherein the rule is easy for a user to memorize and a long one-time password can be obtained.

The invention claimed is:

1. An authentication system comprising:
an identification number receiver that receives a unique identification number of a mobile presentation device from the mobile presentation device;
a table generator that, upon receiving the unique identification number from the mobile presentation device, generates a table having the given numbers of rows and columns for the received unique identification number, each square in the generated table is assigned with a random character string;
a table presenter that causes the mobile presentation device to present the table generated for the unique identification number;
a temporary storage that temporarily stores the received unique identification number in association with the generated table in association;
a user information memory unit that stores user names, each user name being stored in association with a unique identification number and a sequence for selecting positions of a given number of squares from a table having a given number of rows and a given number of columns;
a user name receiver that receives a user name from an authentication device of a user of the authentication device;
a password receiver that receives a password from the authentication device;
a comparison generator that, upon receiving the user name and the password from the authentication device, when a unique identification number is stored in association with the received user name in the user information memory unit and a table is stored in association with the stored unique identification number in the temporary storage, generates a comparison character string for the received user name by selecting, from the stored table, positions of the given number of squares in a sequence stored in association with the received user name in the user information memory unit, and arranging the character strings assigned to the squares at the selected positions; and
an authenticator that determines whether or not to authenticate the user of the authentication device, on the basis of whether or not the received password matches the comparison character string generated for the received user name.

2. The authentication system according to claim 1, wherein the table generator randomly shuffles an array of at least length 50 in which at least five each of the numbers from "0" to "9" are included, successively picks a first two numbers in order included in the shuffled array, and assigns the numbers in the shuffled array in order to squares in the table.

3. An authentication system comprising a server device, a mobile presentation device, and an authentication device, wherein:
the server device and the mobile presentation device are communicably coupled by a mobile communication network,
the server device and the authentication device are communicably coupled by a computer communication network, and
(a) the mobile presentation device comprises:
a unique identification number transmitter for transmitting a unique identification number of the mobile presentation device to the server device via the mobile communication network,
(b) the server device further comprises:
a selector for selecting a random number seed when the identification number is transmitted from the mobile presentation device,
a seed transmitter for transmitting the selected seed to the mobile presentation device via the mobile communication network, and
a temporary storage for temporarily storing the transmitted identification number and the selected seed in association,
(c) the mobile presentation device comprises:
a generator for generating a mobile table when the seed is transmitted from the server device, in which character strings are assigned to each square in the mobile table according to the random number generated by the transmitted seed; and
a table presenter that presents the generated mobile table to the user,
(d) the authentication device comprises:
a user name receiver that receives input of a user name from a user of the authentication device,
a password receiver that receives input of a password from the user of the authentication device, and
a password transmitter for transmitting the user name and the password given by the received input to the server device via the computer communication network, and
(e) the server device further comprises
a user information memory unit in which user names are stored in association with sequences for selecting positions of squares from a table and unique identification numbers,
a table generator that, when the user name and the password is transmitted from the authentication device, a unique identification number is stored in association with the transmitted user name in the user information memory unit and a seed is stored in association with the stored unique identification number in the temporary storage, generates a server table in which character strings are assigned to each square in the server table according to the random number generated by the stored seed, the server table being the same as the mobile table generated at the mobile presentation device,
a comparison generator that generates a comparison character string for the transmitted user name by selecting positions of squares in the server table generated for the unique identification number in the sequence stored in association with the transmitted user name in the user information memory unit, and arranging the character strings assigned to the squares at the selected positions in the stored sequence, an authenticator that determines whether or not to authenticate the user of the authentication device when the user name and the password is transmitted from the authentication device, on the basis of whether or not the transmitted password matches the comparison character string generated for the transmitted user name, and a result transmitter for transmitting the determined authentication result to the authentication device.

4. The authentication system according claim 3, wherein the table generator randomly shuffles an array of at least length 50 in which at least five each of numbers from "0" to "9" are included, successively picks a first two numbers in order included in the shuffled array, and assigns the numbers in the shuffled array in order to squares in the server table.

5. An authentication system comprising a server device, a mobile presentation device, and an authentication device, wherein the server device and the mobile presentation device are communicably coupled by a mobile communication network, the server device and the authentication device are communicably coupled by a computer communication network, and (a) the mobile presentation device comprises:

a unique identification number transmitter for transmitting a unique identification number of the mobile presentation device to the server device via the mobile communication network, (b) the server device comprises:

a selector for selecting a random number seed when the unique identification number is transmitted from the mobile presentation device, a seed transmitter for transmitting the selected seed to the mobile presentation device via the mobile communication network, and a temporary storage for temporarily storing the transmitted unique identification number and the selected seed in association, (c) the mobile presentation device comprises:

a generator for generating a mobile table when the seed is transmitted from the server, in which character strings are assigned to each square in the mobile table according to the random number generated by the transmitted seed, and a table presenter that presents the mobile table, (d) the authentication device comprises;

a user name receiver that receives input of a user name from a user of the authentication device, a password receiver that receives input of a password from the user of the authentication device, and a user name transmitter for transmitting the user name and the password given by the received input to the server device via the computer communication network, and (e) the server device further comprises:

a user information memory unit in which user names, sequences for selecting positions of squares from a table, and unique identification numbers are stored in association, a table generator that, when the user name and the password is transmitted from the authentication device, a unique identification number is stored in association with the transmitted user name in the user information memory unit and a seed is stored in association with the stored unique identification number in the temporary storage, generates a server table in which character strings are assigned to each square in the server table according to the random number generated by the stored seed, the server table being the same as the mobile table generated at the mobile presentation device, a comparison generator that generates a comparison character string for the transmitted user name by selecting positions of squares in the server table generated for the stored unique identification number in the sequence stored in association with the transmitted user name in the user information memory unit, and arranging the character strings assigned to the squares at the selected positions in the stored sequence, an authenticator that determines whether or not to authenticate the user of the authentication device when the user name and the password are transmitted from the authentication device, on the basis of whether or not the transmitted password matches the comparison character string generated for the transmitted user name, and a result transmitter for transmitting the determined authentication result to the authentication device.

6. The authentication system according claim 5, wherein the table generator randomly shuffles an array of at least length 50 in which at least five each of numbers from "0" to "9" are included, successively picks a first two numbers in order included in the shuffled array, and assigns the numbers in the shuffled array in order to squares in the server table.

* * * * *